US012715787B2

(12) United States Patent
Zhang et al.

(10) Patent No.: US 12,715,787 B2
(45) Date of Patent: Aug. 25, 2026

(54) ADSORBENT RESIN FOR REMOVING PERFLUORINATED POLLUTANTS FROM BODY OF WATER, PREPARATION THEREFOR, AND USE THEREOF

(71) Applicant: SUNRESIN NEW MATERIALS CO. LTD., Shaanxi (CN)

(72) Inventors: Li Zhang, Shaanxi (CN); Yanjun Li, Shaanxi (CN); Qiong Liu, Shaanxi (CN); Xiaokang Kou, Shaanxi (CN)

(73) Assignee: SUNRESIN NEW MATERIALS CO. LTD., Shaanxi (CN)

( * ) Notice: Subject to any disclaimer, the term of this patent is extended or adjusted under 35 U.S.C. 154(b) by 930 days.

(21) Appl. No.: 17/790,668

(22) PCT Filed: Dec. 16, 2020

(86) PCT No.: PCT/CN2020/136818
§ 371 (c)(1),
(2) Date: Jul. 1, 2022

(87) PCT Pub. No.: WO2021/143433
PCT Pub. Date: Jul. 22, 2021

(65) Prior Publication Data

US 2023/0038402 A1 Feb. 9, 2023

(30) Foreign Application Priority Data

Jan. 15, 2020 (CN) ........................ 202010042122.2

(51) Int. Cl.

| | |
|---|---|
| ***C02F 1/28*** | (2023.01) |
| ***B01J 20/26*** | (2006.01) |
| ***C02F 101/14*** | (2006.01) |
| ***C08F 112/08*** | (2006.01) |
| ***C08F 112/36*** | (2006.01) |
| ***C08J 3/24*** | (2006.01) |
| ***C08J 9/28*** | (2006.01) |

(52) U.S. Cl.
CPC ............. *C02F 1/285* (2013.01); *B01J 20/267* (2013.01); *C08F 112/08* (2013.01); *C08F 112/36* (2013.01); *C08J 3/24* (2013.01); *C08J 9/28* (2013.01); *C02F 2101/14* (2013.01); *C08J 2325/02* (2013.01)

(58) Field of Classification Search
None
See application file for complete search history.

(56) References Cited

U.S. PATENT DOCUMENTS

| | | | | |
|---|---|---|---|---|
| 5,880,240 | A | 3/1999 | Tsuno | |
| 2019/0352437 | A1* | 11/2019 | Golobish | C08F 6/008 |
| 2020/0139348 | A1* | 5/2020 | Bessonov | B01J 20/3276 |

FOREIGN PATENT DOCUMENTS

| | | | |
|---|---|---|---|
| CN | 101314124 | A | 12/2008 |
| CN | 101605728 | A | 12/2009 |
| CN | 101987291 | A | 3/2011 |
| CN | 101274269 | B | 10/2011 |
| CN | 102295724 | A | 12/2011 |
| CN | 102500338 | B | 6/2012 |
| CN | 102600810 | A * | 7/2012 |
| CN | 102942701 | A * | 2/2013 |
| CN | 102489260 | A | 7/2013 |
| CN | 103408103 | A | 11/2013 |
| CN | 103772573 | A | 5/2014 |
| CN | 104193056 | A | 12/2014 |
| CN | 105001371 | A | 10/2015 |
| CN | 105085829 | A | 11/2015 |
| CN | 105418946 | A | 3/2016 |
| CN | 105504128 | A | 4/2016 |

(Continued)

OTHER PUBLICATIONS

Espacenet translated Abstract for CN102600810A (Year: 2012).*
Extended Search Report Application No. 20914492.2 dated Aug. 5, 2023, 6 pages.
First Office Action of CN2020100421222, Application No. 2020100421222, dated Jan. 27, 2021, 4 pages.

(Continued)

*Primary Examiner* — Benjamin L Lebron
*Assistant Examiner* — Eric J McCullough
(74) *Attorney, Agent, or Firm* — DINSMORE & SHOHL LLP

(57) ABSTRACT

The present invention relates to an adsorbent resin for removing perfluorinated pollutants from a body of water, a preparation therefor and the use thereof. The objective is to solve the problem of traditional adsorbent materials, such as active carbon materials, having a poor effect in terms of removing perfluorooctanoic acid from water, being non-renewable, etc. In the present method, styrene and divinylbenzene are used as framework materials, a suitable pore-forming agent and a suitable dispersant are selected in order to prepare a macroporous resin with a moderate pore size, and an alkylation reaction is carried out at a low hindrance with p-xylylene dichloride (XDC) being used as a post-crosslinking agent, whereby a rigid benzene ring structure is introduced into the resin by means of post-crosslinking, thereby further increasing the hydrophobicity of the resin and increasing the crosslinking degree thereof; in addition, the micropore structure is adjusted in order to obtain an adsorbent resin with a narrow particle size distribution, a uniform pore size and a high specific surface area. The size of micropores in the resin is close to the molecular size of perfluorooctanoates in water, the adsorbate sieving capacity is strong, and the adsorption rate of perfluorinated compounds can be further improved.

1 Claim, No Drawings

(56) References Cited

FOREIGN PATENT DOCUMENTS

| | | | |
|---|---|---|---|
| CN | 105776404 | A | 7/2016 |
| CN | 106732379 | A | 5/2017 |
| CN | 108144572 | A | 6/2018 |
| CN | 108264127 | A | 7/2018 |
| CN | 111171199 | A | 5/2020 |
| EP | 1270621 | A1 | 1/2003 |
| TW | 201444770 | A | 12/2014 |
| WO | 2008101137 | A1 | 8/2008 |
| WO | 2017218528 | A1 | 12/2017 |

OTHER PUBLICATIONS

International Search Report, PCT/CN2020/136818, dated Mar. 16, 2021, 5 pages.

Office Action of Corresponding Canadian Application No. 3,166,721 Dated Aug. 18, 2023, 4 pages.

* cited by examiner

ADSORBENT RESIN FOR REMOVING PERFLUORINATED POLLUTANTS FROM BODY OF WATER, PREPARATION THEREFOR, AND USE THEREOF

TECHNICAL FIELD

The invention relates to a macroporous adsorbent resin and a preparation method thereof. More specifically, the invention relates to a macroporous adsorbent resin for removing perfluorinated pollutants from a body of water and a preparation method thereof, belonging to the field of functional polymer materials and environmental protection.

BACKGROUND

Perluorooctane sulfonate, as the final degradation product of perfluorinated compounds, contains multiple fluorocarbon long chains, sulfonic acids, carboxylic acids and other groups in its structure, resulting in its hydrophobic and oleophobic properties. Due to the strong polarity of C—F bonds, PFOS becomes one of the most difficult organic pollutants to decompose. Due to the harm of PFOS to the environment and human body, the production of related products has been terminated one after another around the world.

Patents CN102489260B, CN102500338B, CN105776404A and CN103408103A involve traditional adsorption materials. Cotton, cellulose, nylon and reverse osmosis membrane materials are used to remove perfluorinated compounds in water, which has a certain possibility of promotion. However, due to low removal efficiency or cost problem, there are few industrial applications. Patents CN104193056B, CN108264127A and CN105001371B are different from traditional adsorption materials by using light radiation, photocatalysis, molecular imprinting, induced electrochemistry and other methods to degrade trace perfluorinated compounds in water, but due to harsh conditions, difficult operation and high energy consumption, practical applications cannot be promoted on a large scale.

According to the molecular characteristics of PFOS, anion exchange resin and activated carbon material with appropriate pore size can effectively remove trace pollutants in water. 3M company abroad has published a patent with the publication number CN101605728B, which involves the restriction of the structure and functional groups of ion exchange resins for removing pollutants; activated carbon (granule or powder) as the most commonly used filtration and adsorption material is applied in removing perfluorooctanoic acid in patents CN106732379A and CN108144572A. Therefore, in the prior art for removing perfluorinated pollutants from a body of water, there is still a lack of adsorbents with low cost, simple operation and high efficiency in treatment at the same time.

SUMMARY OF THE INVENTION

The invention focuses on the preparation of macroporous adsorbent resin with large adsorption capacity, easy elution and long service cycle. Starting from the design of polymer structure, commonly used styrene and divinylbenzene are selected as comonomers and cross-linking agents. Resin-based spheres with appropriate pore size structure can be prepared by adjusting the proportion of a porogen. Using p-xylylene dichloride (XDC) as a post-crosslinking agent, carrying out an alkylation reaction under low steric hindrance, thereby introducing a rigid benzene ring structure through post-crosslinking, further improving the hydrophobicity of the resin, improving the adsorption capacity of the resin to the adsorbate, and at the same time adjusting the microstructure, increasing the specific surface area, and improving the precision and efficiency of pollutant removal.

The invention aims to solve the problem that the existing adsorption materials such as cellulose, activated carbon or anion exchange resin cannot properly treat the harmful substances of trace perfluorooctanoic acid in water, and provides a method for preparing macroporous adsorbent resin with high adsorption precision, large adsorption capacity and long service period. The macroporous adsorbent resin according to the preparation method of the invention, can effectively remove perfluorinated compound pollutants in drinking water.

In order to realize the above-mentioned purpose of the invention, the specific technical solution is as follows:

Provided is a method for preparing an adsorbent resin for removing perfluorinated pollutants from a body of water, comprising the following steps:

Step 1: The preparation of macroporous adsorbent resin with polystyrene skeleton Carrying out a suspension polymerization by using styrene, divinylbenzene or multiple vinyl-containing as monomers and cross-linking agents with adding a porogen to obtain macroporous adsorbent resin. After washing off the porogen, the resin has a particle size of 0.4-1.2 mm, and it is dried for use.

Step 2: Post cross-linking reaction of the adsorbent resin

Adding a quantitative amount of a solvent to the dry resin-based spheres obtained in step 1 to swell, adding a post-crosslinking agent to carry out a second post-crosslinking through Friedel-Crafts alkylation reaction, thereby improving the cross-linking degree of the resin, and obtaining macroporous adsorbent resin with a high specific surface area.

More specifically, in the step 1, the multiple vinyl-containing benzene monomer can be selected from the group consisting of styrene, divinylbenzene and divinylxylene, and any mixture thereof, wherein an isotactic ratio of divinylbenzene is not less than 80%; the porogen can be selected from the group consisting of toluene, gasoline, methylcyclohexane and n-butanol, and any mixture thereof; and a mass ratio of the porogen to the multiple vinyl-containing benzene monomer is 1-2:1.

The step 2 comprises the following process steps: accurately weighing the dry resin-based spheres prepared in the step (1) into a reactor, adding dichloroethane and p-xylylene dichloride, stirring and swelling at room temperature, adding ferric chloride or zinc chloride as catalyst in batches, and allowing the resin to undergo a second post-crosslinking reaction; firstly washing with boiling water, then cooling to room temperature, soaking and washing with ethanol, rinsing with deionized water, and filtering out the product. Dichloroethane acts as a solvent and is added in an amount 6-8 times that of the monomer; p-xylylene dichloride acts as the second crosslinking agent and is added in an amount 0.5-0.6 times that of the mass of the monomer; and ferric chloride acts as the catalyst and is added in an amount 0.1-0.2 times that of the mass of the monomer.

Styrene and divinylbenzene are used as monomers and cross-linking agents, and the resin is regulated in terms of the microstructure by adjusting the amount of porogen, thereby obtaining microspheres with pore size suitable for perfluorinated compound molecules. By using P-xylylene dichloride (XDC) as a cross-linking agent, the alkylation reaction is carried out under low steric hindrance, and thus a rigid benzene ring structure is introduced into the resin through post-crosslinking, which further improves the hydrophobicity of the resin, increases the specific surface area of the resin, and improves the adsorption efficiency and capacity of the resin to pollutants, and effectively improves the use effect and application field of the resin.

The invention can effectively remove the perfluorinated pollutants contained in the body of water, and the perfluorinated content in the treated water is lower than 70 ng/L. The macroporous adsorbent resin has regenerability, and repeated use can effectively save industrial application costs, and effectively make up for the shortcomings of other perfluorinated pollutant removal methods.

DETAILED DESCRIPTION

Example 1

Provided is a method for preparing adsorbent resin for effectively removing perfluorinated pollutants from a body of water, and the specific steps were as follows:

Step 1. Suspension Polymerization:

500 g of deionized water and 4 g of polyvinyl alcohol were accurately weighed into a reactor, heated up to 40-50° C., and stirred to mix all the raw materials well, thereby producing an aqueous phase; 100 g of divinylbenzene, 120 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets to have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and then the resin was dried to constant weight for use;

Step 2. Post-Crosslinking Reaction:

80 g of the dry resin-based spheres prepared in step 1 was accurately weighed into a reactor, 800 g of dichloroethane and 50 g of p-xylylene dichloride were added, and stirred and swelled at room temperature for 10 h to ensure that the XDC was fully dissolved and the spheres were fully swollen, then cooled to 0-5° C. using an ice-salt bath, and 20 g of ferric chloride was added in batches thereto. The reaction was kept for 30 min in the ice-salt bath, then kept at room temperature for 45 min, then heated up to 80° C. and kept for 10 h to complete the reaction. The obtained resin was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 1

Provided is a method for preparing adsorbent resin for removing perfluorinated pollutants from a body of water:

Step 1. Suspension Polymerization:

500 g of deionized water and 4 g of polyvinyl alcohol were accurately weighed into a reactor, heated up to 40-50° C., and stirred to mix all the raw materials well, thereby producing an aqueous phase; 100 g of divinylbenzene, 120 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin.

Step 2. Resin Cleaning for Water Treatment:

The resin obtained in step 1 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 2

Provided is a method for preparing adsorbent resin for removing perfluorinated pollutants from a body of water:

Step 1. Suspension Polymerization:

500 g of deionized water, 25 g of sodium chloride and 4 g of polyvinyl alcohol were accurately weighed into a reactor, heated up to 45° C., stirred to mix all the raw materials well, thereby producing an aqueous phase; 100 g of divinylbenzene, 85 g of toluene, 35 g of gasoline 200# and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and then the resin was dried to constant weight for use;

Step 2. Post-Crosslinking Reaction:

80 g of the dry resin-based spheres prepared in step 1 was accurately weighed into a reactor, 800 g of dichloroethane and 50 g of p-xylylene dichloride were added, and stirred and swelled at room temperature for 10 h to ensure that the XDC was fully dissolved and the spheres were fully swollen, then cooled to 0-5° C. using an ice-salt bath, and 20 g of ferric chloride was added in batches thereto. The reaction was kept for 30 min in the ice-salt bath, then kept at room temperature for 45 min, then heated up to 80° C. and kept for 10 h to complete the reaction;

Step 3. Resin Cleaning for Water Treatment:

The resin obtained in step 2 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 3

Provided is a method for preparing adsorbent resin for removing perfluorinated pollutants from a body of water:

Step 1. Suspension Polymerization:

500 g of deionized water, 25 g of sodium chloride and 4 g of polyvinyl alcohol were accurately weighed into a reactor, heated up to 45° C., and stirred to mix all the raw materials well, thereby producing an aqueous phase; 100 g of divinylbenzene, 100 g of toluene, 100 g of methylcyclohexane and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, then heated up to 82° C. and held for 4 h, then heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 800 g of dichloroethane and 50 g of p-xylylene dichloride were added thereto, and stirred and swelled at room temperature for 10 h to ensure that the XDC was fully dissolved and the spheres were fully swollen, then cooled to 0-5° C. using an ice-salt bath, and 20 g of ferric chloride was added in batches. The reaction was kept for 30 min in the ice-salt bath, then kept at room temperature for 45 min, heated up to 80° C. and reacted for 10 h, and the reaction was completed;

Step 3. Resin Cleaning for Water Treatment:

The resin obtained in step 2 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 4

Provides is a method for preparing adsorbent resin for removing perfluorinated pollutants from a body of water:

Step 1. Suspension Polymerization:

400 g of deionized water and 6 g of polyvinyl alcohol were accurately weighed into a reactor, heated up to 45° C., and stirred to mix all the raw materials well, thereby producing an aqueous phase; 80 g of divinylbenzene, 140 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to make allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 800 g of dichloroethane and 60 g of p-xylylene dichloride were added thereto, and stirred and swelled at room temperature for 10 h to ensure that the XDC was fully dissolved and the spheres were fully swollen, cooled to 0-5° C. using an ice-salt bath, and 18 g of ferric chloride was added in batches. The reaction was kept for 30 min in the ice-salt bath, then kept at room temperature for 45 min, heated up to 80° C. and reacted for 10 h, and the reaction was completed;

Step 3. Resin Cleaning for Water Treatment:

The resin obtained in step 2 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 5

Provided is a method for preparing adsorbent resin for removing perfluorinated pollutants from a body of water:

Step 1. Suspension Polymerization:

500 g of deionized water and 4 g of polyvinyl alcohol were accurately weighed into a reactor, heated up to 45° C., and stirred to mix all the raw materials well, thereby obtaining an aqueous phase; 100 g of divinylbenzene, 120 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 800 g of dichloroethane were added thereto, and stirred and swelled at room temperature for 10 h to ensure that the spheres were fully swollen, cooled to 0-5° C. using an ice-salt bath, and 20 g of ferric chloride was added in batches. The reaction was kept for 30 min in the ice-salt bath, then kept at room temperature for 45 min, heated up to 80° C. and reacted for 10 h, and the reaction was completed;

Step 3. Resin Cleaning for Water Treatment:

The resin obtained in step 2 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 6

Provided is a method for preparing adsorbent resin for removing perfluorinated pollutants from a body of water:

Step 1. Suspension Polymerization:

500 g of deionized water and 4 g of polyvinyl alcohol were accurately weighed into a reactor, heated up to 45° C., and stirred to mix all the raw materials well, thereby producing an aqueous phase; 100 g of divinylbenzene, 120 g of toluene and 1 g of benzoyl peroxide were accurately weighed and mixed well in a beaker according to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 800 g of dichloroethane were added thereto, and stirred and swelled at room temperature for 10 h to ensure that the spheres were fully swollen, cooled to 0-5° C. using an ice-salt bath, and 20 g of zinc chloride was added in batches. The reaction was kept for 30 min in the ice-salt bath, then kept at room temperature for 45 min, heated up to 80° C. and reacted for 10 h, and the reaction was completed;

Step 3. Resin Cleaning for Water Treatment:

The resin obtained in step 2 was soaked and cleaned with acetone, rinsed with deionized water, then rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 7

Provided is a method for preparing adsorbent resin for removing perfluorinated pollutants from a body of water:

Step 1. Suspension Polymerization:

500 g of deionized water and 4 g of polyvinyl alcohol were accurately weighed into a reactor, heated up to 40-50° C., and stirred to mix all the raw materials well, thereby producing an aqueous phase; 100 g of divinylbenzene, 120 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 600 g of dichloroethane and 50 g of p-xylylene dichloride were added thereto, and stirred and swelled at room temperature for 10 h to ensure that the XDC was fully dissolved and the spheres were fully swollen, cooled to 0-5° C. using an ice-salt bath, and 20 g of ferric chloride was added in batches. The reaction was kept for 30 min in the ice-salt bath, then kept at room temperature for 45 min, heated up to 80° C. and reacted for 10 h, and the reaction was completed; The obtained resin was soaked and cleaned with acetone, rinsed with deionized water, rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Comparative Example 8

Provided is a method for preparing adsorbent resin for removing perfluorinated pollutants from a body of water:

Step 1. Suspension Polymerization:

500 g of deionized water and 4 g of polyvinyl alcohol were accurately weighed into a reactor, heated up to 40-50° C., and stirred to mix all the raw materials well, thereby producing an aqueous phase; 100 g of divinylbenzene, 120 g of toluene and 1 g of benzoyl peroxide were accurately weighed and mixed well in a beaker to produce an oil phase;

The aqueous phase was allowed to stand for 20 min and then the oil phase was added slowly thereto, and the stirring speed was adjusted to allow oil droplets have a size distribution in the range of 45-20 mesh; heated up to 75° C. and held for 3 h, heated up to 82° C. and held for 4 h, heated up to 87° C. and held for 4 h, and the reaction was terminated;

After suction filtration, the obtained mixture was boiled with hot water for repeated washing; the porogen was removed by ethanol in an extractor; then a large amount of deionized water was used to clean the residual ethanol inside the resin; and the resin was dried to constant weight for use;

Step 2. Post-Crosslinking Reaction:

80 g of the dry resin-based spheres prepared in step 1 was accurately weighed into a reactor, 600 g of dichloroethane and 50 g of p-xylylene dichloride were added thereto, and stirred and swelled at room temperature for 10 h to ensure that the XDC was fully dissolved and the spheres were fully swollen, cooled to 0-5° C. using an ice-salt bath, and 10 g of ferric chloride was added in batches. The reaction was kept for 30 min in the ice-salt bath, then kept at room temperature for 45 min, heated up to 80° C. and reacted for 10 h, and the reaction was completed; The obtained resin was soaked and cleaned with acetone, rinsed with deionized water, rinsed with ethanol and ionized water respectively, and filtered out to obtain the product. The particle size and specific surface area of the product were tested by 3H-2000III automatic nitrogen adsorption specific surface area tester and Malvern MS3000 laser particle sizer respectively. The detailed results were shown in Table 1.

Evaluation Test:

Evaluation of Adsorption Performance of Perfluorinated Pollutants in Water 0.1 g of each of the 9 different resins prepared in the examples was accurately weighed and placed into polyethylene terephthalate plastic bottles of 125 milliliters respectively, and 100 milliliters of perfluorooctanoic acid and potassium perfluorooctanoic acid sulfonate solutions with a concentration of 10 ug/L were added thereto respectively. The bottles were placed on a shaker to perform shaking for 100 h at 25° C. and a frequency of 150 rpm. After the shaking was completed, 2 ml of the solution was taken and centrifuged at high speed, and then the samples were tested by LC-MS/MS. The relevant results are shown in the table. It can be seen from Table 1 that the macroporous adsorbent resin with a high cross-linking degree obtained by second cross-linking using p-xylylene dichloride as a cross-linking agent had the best effect on removing trace perfluorinated pollutants in water, up to more than 99%.

TABLE 1

Removal effects on perfluorooctanoic acid (or salt) by resins prepared by different methods

| | Key index | | | | | | |
|---|---|---|---|---|---|---|---|
| | Effective particle size | Micro-pore diameter | Specific surface area | Exit Concentration (ug/L) | | Adsorption rate (%) | |
| | (mm) | (nm) | ($m^2/g$) | PFOA | PFOS | PFOA | PFOS |
| Example 1 | 0.45 | 4.32 | 987 | 0.068 | 0.097 | 99.32 | 99.03 |
| Comparative Example 1 | 0.47 | 6.8 | 639 | 2.254 | 2.652 | 77.46 | 73.48 |
| Comparative Example 2 | 0.41 | 5.43 | 765 | 0.678 | 0.757 | 93.22 | 92.43 |
| Comparative Example 3 | 0.51 | 3.87 | 637 | 3.067 | 3.659 | 69.33 | 63.41 |
| Comparative Example 4 | 0.52 | 4.3 | 732 | 0.972 | 1.257 | 90.28 | 87.43 |
| Comparative Example 5 | 0.46 | 4.4 | 708 | 1.252 | 1.723 | 87.48 | 82.77 |
| Comparative Example 6 | 0.45 | 4.7 | 768 | 0.765 | 0.821 | 92.35 | 91.79 |
| Comparative Example 7 | 0.43 | 4.6 | 687 | 1.09 | 1.14 | 89.1 | 88.6 |
| Comparative Example 8 | 0.46 | 4.5 | 756 | 0.835 | 0.87 | 91.65 | 91.3 |

The invention claimed is:

1. A method for preparing an adsorbent resin for removing perfluorinated pollutants from a body of water, wherein the method comprises the following steps:

accurately weighing 500 g of deionized water and 4 g of polyvinyl alcohol into a reactor, heating up to 40-50° C., starting stirring to mix well, thereby producing an aqueous phase;

accurately weighing and mixing well 100 g of divinylbenzene, 120 g of toluene and 1 g of benzoyl peroxide in a beaker to produce an oil phase;

allowing the aqueous phase to stand for 20 min and then adding the oil phase thereto, and adjusting the stirring speed to allow oil droplets to have a size distribution in the range of 45-20 mesh;

heating up to 75° C. and holding for 3 h, heating up to 82° C. and holding for 4 h, heating up to 87° C. and holding for 4 h, terminating the reaction;

drying after removing the porogen with ethanol to obtain dry resin-based spheres;

accurately weighing 80 g of the dry resin-based spheres into the reactor, adding 800 g of dichloroethane and 50 g of p-xylylene dichloride, stirring and swelling at room temperature for 10 h to ensure that the p-xylylene dichloride is fully dissolved and the dry resin-based spheres are fully swollen, cooling to 0-5° C. using an ice-salt bath, adding 20 g of ferric chloride in batches, keeping the reaction in the ice-salt bath for 30 min, carrying out the reaction at room temperature for 45 min, heating up to 80° C. and reacting for 10 h, and completing the reaction;

the resin obtained was soaked and cleaned with acetone, rinsed with deionized water, then rinsed with ethanol and ionized water respectively, and filtered out to obtain the product, and the product has particle size of 0.45 mm tested by using Malvern MS3000 laser particle sizer, and a specific surface area of 987 $m^2/g$ and an average micropore diameter of 4.32 nm tested by using 3H-2000III automatic nitrogen adsorption specific surface area tester.

* * * * *